Dec. 14, 1937.                L. B. BRUNNER                2,101,980
                    GUARD ATTACHMENT FOR MIXING MACHINES
                           Filed April 1, 1937

INVENTOR.
Lillian B. Brunner
BY Hull, Brock & West
ATTORNEY.

Patented Dec. 14, 1937

2,101,980

UNITED STATES PATENT OFFICE 2,101,980

GUARD ATTACHMENT FOR MIXING MACHINES

Lillian B. Brunner, Shaker Heights, Ohio

Application April 1, 1937, Serial No. 134,370

4 Claims. (Cl. 259—1)

This invention relates, generally, to that class of machines used for mixing cake dough or batter, as well as other kinds of food stuffs.

When mixing dough or heavy batter, the dough or batter creeps up the spindles of the machine and, unless measures are taken to prevent it, accumulates upon the casing of the spindle driving mechanism.

My invention consists of a guard for attachment to the spindles of machines of the class referred to for arresting the dough or batter before it reaches the casing and returning it to the mixing bowl or receptacle, incidentally in such manner as to retain the dough or batter in a rather compact mass or ball and thus prevent it from accumulating about the wall of the receptacle out of reach of the agitating or mixing means.

Among the objects of the invention are to provide a very simple and cheap guard that may be attached to mixing machines of prevailing design without making any change therein and without the use of fastening means; and to provide a device of this character that is very effective; that is sanitary and easy to keep clean; that is especially convenient of attachment and detachment; that in no way interferes with the customary method of using the machine, as when adding ingredients to the mixture, and that is stationary when the machine is in operation, thus preventing the dough or batter from being slung from the guard by centrifugal force, and causing it to drop from the guard onto the mass of mixture in the receptacle so as to keep the dough or batter from spreading unduly over the side wall of the receptacle.

The present preferred embodiment of the invention, as illustrated in the accompanying drawing, is for use on a two-spindle machine. In this case the guard consists of a plate having apertures for the spindles and, when attached, reposes between shoulders or collars on the spindles, that are standard in the type of mixer shown, and the socket members that receive the shanks of the spindles. Obviously, the guard is positively held against rotation with respect to each spindle by reason of its cooperation with the other spindle. Where the invention is to be used on a single spindle mixer, such as the larger types used in bakeries, hotels and other large institutions, the guard has but one aperture and, mounted on the spindle as in the present example, includes a part arranged to cooperate with a stationary part of the machine so as to hold the guard against turning, such a modification being self-evident.

Figure 1:
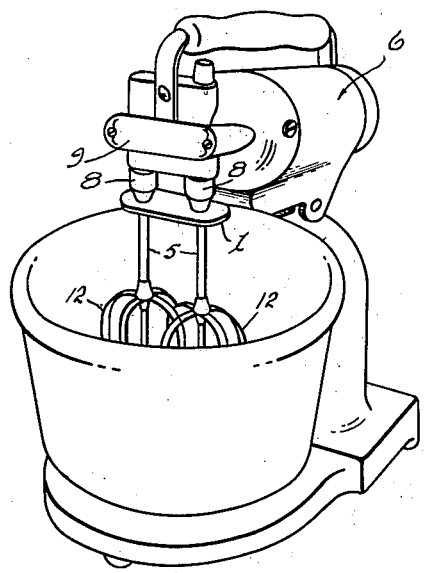
Figure 2:
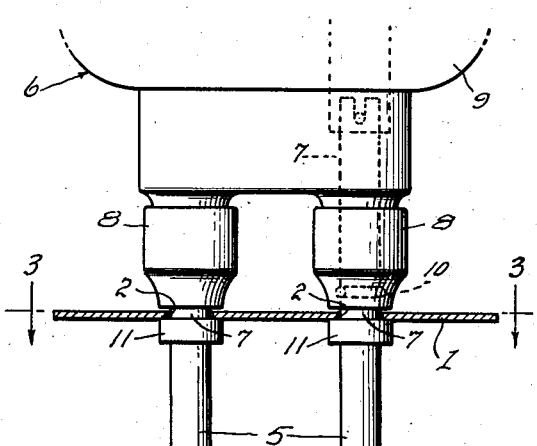
Figure 2:
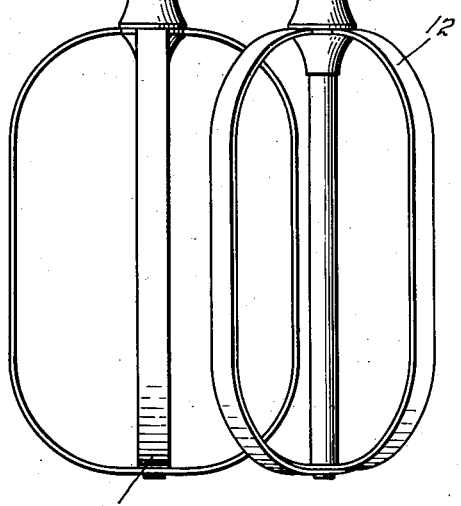
Figure 3:
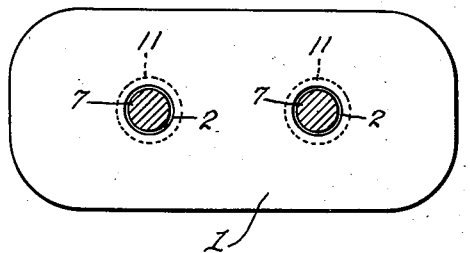

In the drawing, Fig. 1 is a perspective view of a mixing machine of the two-spindle type to which my improved guard is shown attached; Fig. 2 is a fragmentary front elevation of the machine with the guard, shown in central longitudinal section, attached thereto, and Fig. 3 is a section on the line 3—3 of Fig. 2.

The guard is designated 1 and it is shown as consisting of an elongated flat plate, which may be of metal or other suitable material, having apertures 2 that are desirably centered approximately on the longitudinal axis of the plate and spaced, respectively, like distances from the opposite ends thereof.

The spacing apart of the apertures 2 corresponds to that of the spindles 5 of the mixing machine, designated generally by the numeral 6. The apertures are of a size to freely receive the shanks 7 of the spindles 5, and such shanks are engaged endwise through the apertures preparatory to inserting them into the socket members 8 for driving connection with the mechanism housed within the casing 9. The nature of the driving connection between said mechanism and one of the spindles is indicated in dotted lines in Fig. 2, as is also a releasable connection 10 between said shank and the corresponding socket member 8. The spindles 5 are equipped with collars 11 which, with the dotted line parts just referred to, are standard in the type of machine illustrated and constitute no part of my improvements. When attached to the machine, the guard 1 reposes between shoulders provided by the collars 11 and the lower ends of the socket members 8.

Observed from above, the area of the guard 1 is approximately the same as the field of operation of the agitators or mixers 12 that are on the lower ends of the spindles 5. Being no larger, the guard does not interfere with the usual way of introducing ingredients into the mixing bowl while the machine is in operation.

As the spindles rotate at a high rate of speed, the dough or batter creeps up the spindles and accumulates on the under side of the guard and, upon being crowded to the edge, drops directly downwardly onto the mass about the agitators or mixers and tends to prevent the dough or batter from unduly spreading over the side wall of the bowl, which would require occasionally scraping it from said wall with a knife or spoon, and insures a more thorough and uniform mixing of the ingredients. Furthermore, the guard obviates the possible danger of personal injury to the user and damage to the agitators or mixers as well as to the bowl that would result from the natural inclination or instinct of the user to employ a knife for scraping the dough or batter from the spindles adjacent the mixers while the machine is in operation.

Having thus described my invention, what I claim is:

1. For use with a mixing machine incorporating a mixer spindle provided with a shoulder and a shank therebyond, the machine including a socket member into which said shank is adapted to be releasably engaged; a guard attachment consisting of a solid flat plate devoid of protuberances and having an aperture whose diameter is slightly greater than that of the shank and through which the shank is adapted to be inserted thereby to dispose the guard attachment between the shoulder and the end of the socket member, the guard attachment being sustained in position by said shoulder and including a part arranged for cooperation with a part of the machine whereby the guard is held stationary when the spindle is rotating.

2. For use with mixing machines of the type incorporating two spindles having circumferential shoulders with shanks extending therebeyond in one direction and mixers on the spindles beyond the shoulders in the opposite direction; a guard consisting of a flat plate having two apertures for endwise engagement therethrough of the shanks of the spindles so that the guard may rest upon and be supported solely by said shoulders, the area of the guard in plan being approximately the same as that of the field of operation of the mixers when observed from above.

3. For use with mixing machines of the type incorporating two spindles having circumferential shoulders with shanks extending therebeyond in one direction and mixers on the spindles beyond the shoulders in the opposite direction; a guard consisting of a plate having two apertures for endwise engagement therethrough of the shanks of the mixer spindles so that the guard may rest upon and be supported solely by said shoulders.

4. For use with mixing machines of the type incorporating two spindles having circumferential shoulders with shanks extending therebeyond in one direction and mixers on the spindles beyond the shoulders in the opposite direction; a guard consisting of an elongated plate having two apertures for endwise engagement therethrough of the shanks of the mixer spindles so that the guard may rest upon and be supported solely by said shoulders, said apertures being centered approximately on the longitudinal axis of the guard and spaced, respectively, like distances from the opposite ends thereof.

LILLIAN B. BRUNNER.